Jan. 17, 1961  K. G. F. MOELLER  2,968,458
SHOCK RESISTANT FOUNDATION
Filed June 23, 1959

INVENTOR
K. G. F. MOELLER

BY
ATTORNEY

United States Patent Office 2,968,458
Patented Jan. 17, 1961

2,968,458
SHOCK RESISTANT FOUNDATION

Kurt G. F. Moeller, Annapolis, Md., assignor to the United States of America as represented by the Secretary of the Navy Filed June 23, 1959, Ser. No. 822,400
7 Claims. (Cl. 248—19)
(Granted under Title 35, U.S. Code (1952), sec. 266)

The invention described herein may be manufactured and used by or for the Government of the United States of America for governmental purposes without the payment of any royalties thereon or therefor.

The present invention relates to a shock resistant foundation and more particularly to a mount for massive equipment which provides shock protection for a portion of a ship where massive equipment is located.

An underwater explosion in the vicinity of a ship causes a shock wave which hits that portion of the ship facing the source of explosion. The incident shockwave causes an acceleration of the skin of the ship and the structural members immediately connected thereto. Every piece of equipment connected solidly to this portion of the ship's structure will undergo an acceleration which depends upon the transmission of the shock forces; and solid connections with practically no elasticity will result in transmission of the full force of the shock to the equipment.

Equipment of relatively low mass will try to follow the motion initiated by the first impact, but the bolts which fasten the equipment to the mounts keep the equipment in place with respect to the supporting structure.

In the case of equipment having relatively high mass the result is basically the same but due to the inertia of the equipment however, the possible motion due to acceleration of the ship's surface is relatively small. Since the hull of the ship is relatively flexible, large shear forces may develop at the lines or points of contact with the heavy equipment. It has been shown by experiments that in such cases the entire portion of the hull which supports the heavy mass can be sheared off resulting in a hole through which the equipment may fall, due to its own weight, to the bottom of the sea.

Therefore, it can be stated that in the case of large masses the ship structure rather than the heavy equipment must be protected against shock damage. It has been further learned from experiments that shock forces diminish with "structural distance"; that is, the length of the structural members between the shock receiving surface and the specific item of equipment. For this reason equipment which is mounted on a deck is subjected to much lower shock forces than equipment which is mounted directly on the hull.

Obviously by increasing structural distance to heavy equipment the structural members would absorb the major portion of the shock. However since cost and maneuverability dictate that maximum use be made of the volume inside the ship's hull, spacing heavy equipment a great distance from the hull is impractical.

In general, two types of shock protection are currently in use. The first consists of the provision of compliant or resilient material between members to absorb the shock; the second utilizes yieldable members such as corrugated sheets of relatively rigid material.

The first, however, exhibits creep due to constant strain which in time requires either realignment of equipment supported on the material or, in time, replacement of the resilient material due to deterioration. Corrugated material, on the other hand, becomes deformed by the first severe shock and must be replaced.

The present invention comprises two channel members which are arranged in parallel spaced relationship. The channel members are supported by and fixedly mounted on transverse frame members. An I-beam is located between the two channel members and is held in frictional contact therewith by a plurality of bolts, the web of the I-beam being sufficiently high to permit vertical movement of the channels relative to the I-beam. The equipment to be supported is mounted on the I-beam directly above the transverse frame members, and midway between each pair of transverse frame members the channels are bolted to the I-beam. The arrangement is such that a shock applied to the frame must travel along the channels to the bolt and back along the I-beam before reaching the equipment.

Thus it will be realized that the inherent elasticity of the structural members absorbs the shock without the disadvantages present in conventional shock mountings of compliant or yieldable material. The channels and I-beams will not exhibit creep as does compliant material such as rubber or springs; nor will the channels and I-beams require replacement due to deformation as in the case of corrugated material.

It is therefore an object of the present invention to provide an improved shock resistant foundation.

Another object is the provision of shock resistant sub-base for mounting of equipment.

A further object of this invention is to provide a sub-base for large masses which provides sufficient structural distance without changing the geometrical distance appreciably.

A still further object is the provision of a shock resistant sub-base utilizing standard shaped, readily available structural members.

Still another object of this invention is to provide a system for rendering equipment captive in the event of severe shock and to provide a mechanical fuse to keep structural damage at a minimum.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
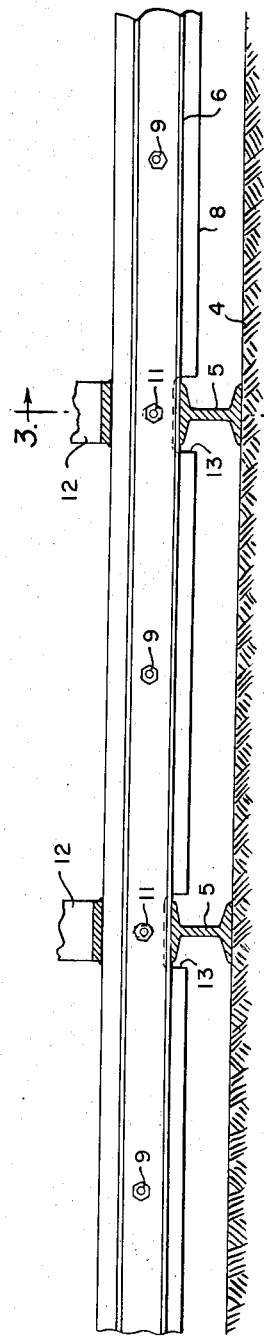
Fig. 1 is a side elevation view, partly in vertical section, of a fragmentary portion of a preferred embodiment of the invention.
Figure 2:
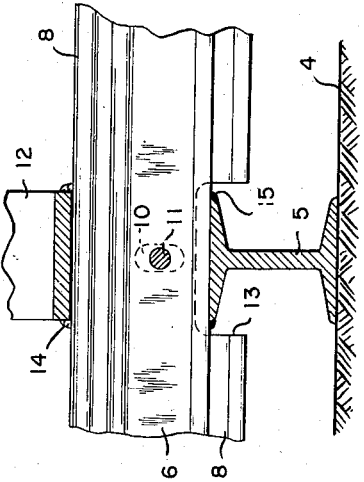
Fig. 2 is an enlarged and more detailed view of a fragmentary portion of the embodiment shown in Fig. 1.

Referring now to the drawings, wherein like reference characters designate like or corresponding parts throughout the several views, there is shown in Fig. 1 (which illustrates a preferred embodiment) a portion of a ship's hull 4 which is reinforced in accordance with common practice by transverse frame members 5, shown in the drawings as I-beams, but which could obviously have other configurations. Rigidly connected to the transverse frame members 5 by welds 15 (Fig. 2) are a pair of channel members 6 and 7 running parallel to the longitudinal axis of the ship and being spaced from each other by the web of an I-beam 8. The web of I-beam 8 is deeper than the depth of channels 6 and 7 for reasons which will be obvious from the discussion of operation which follows. Notches 13 are cut into I-beam 8 at each of the transverse frame members to allow the channels 6 and 7 to be secured to the frame members by means of bolts, rivets, a weld or the like.

The channels 6 and 7 are spaced closely enough to engage the web of I-beam 8 in frictional contact. I-beam 8 is rigidly secured by means of a bolt or the like 9 to channels 6 and 7 at points substantially midway between each two transverse frame members.

Equipment supports 12 are preferably secured to I-beam 8 by welds 14 at points directly opposite transverse frame members 5. For greater frictional contact between I-beam 8 and channels 6 and 7 a bolt or the like 11 may be passed through each of the channels and through an elongated slot 10 in said I-beam at predetermined points between bolts 9.

With the structure described, a shock wave impinging upon the hull of the ship 4 will be transmitted through the transverse frame members 5 to the channel members 6 and 7 down the channel members to the rigid connection at bolt 9, thence back through I-beam 8, before reaching the equipment through equipment support 12. The length of the members is dependent upon the extension of the equipment and the area over which the load is to be distributed.

Figure 3:
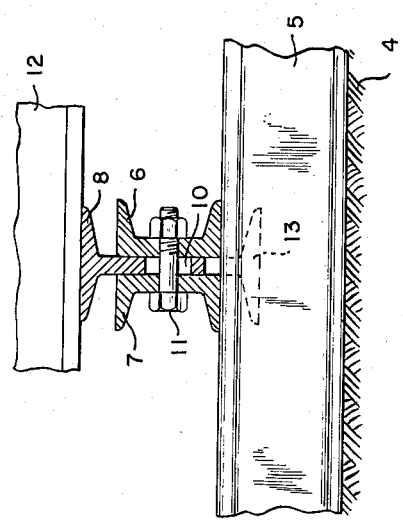
Fig. 3 shows a section of the device taken on the line 3—3 of Fig. 1 looking in the direction of the arrows.

It will be realized that the shock wave causes motion of the structures upon which it is transmitted. As shown in Fig. 3, the web of the I-beam is deeper than the width of the channel members to allow the members to vibrate with respect to one another. In a practical embodiment it was found that one inch of web above and below the channel members was sufficient for this purpose.

It should also be noted that the frictional engagement of the members will tend to absorb a large amount of the shock energy and will prevent undamped vibration of large excursion. By virtue of the rigid connection being midway between the transverse frame members, maximum damping is obtained. For this reason, any bolts placed between these midpoints require an elongated hole to allow for vibration.

It will be realized that the strength of all members must be chosen with consideration not only of the weight of the equipment, but also the force due to shock. The weakest points will necessarily be the bolts since these, of necessity, have the smallest cross-section. It is desirable to countersink the bolt heads to give greater cross-section against shearing forces. An added feature of this embodiment is the fact that if the bolts do sheer under an extreme shock, the equipment secured to the device will still be held captive by the I-beam between the channels.

The connecting bolts may also be designed to act as mechanical fuses. By designing the bolts so that they will shear before the elastic limits of the I-beam and channels are reached, more of the shock forces will be dissipated and only the bolts will need replacement to render the equipment in operating condition once again.

It will also be seen by those skilled in the art that various other shapes could be utilized for carrying out the instant invention. For example, angles could be used instead of channels and T-beams instead of I-beams. Brackets could be supplied to ascertain that the system would be held captive in case of failure under extreme shock.

Obviously this invention could be modified by one skilled in the art for use anywhere vibration damping might be required and is therefore not limited to ships.

Thus there has been described a device which, by use of standard shapes and readily available materials, provides shock protection by increasing structural distance without increasing geometrical distance appreciably and without the inherent disadvantages of prior devices for this purpose.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. A shock resistant foundation for the mounting of heavy equipment comprising a plurality of spaced base support members, a pair of channels secured to said base support members in parallel spaced relationship with each other, the longitudinal axis of said channels being transverse to the longitudinal axis of said base support members, an I-beam positioned with its web between said channels and in frictional engagement therewith; fastening means rigidly connecting said I-beam and said channels only at points spaced substantially midway only between each two said spaced base support members, and an equipment mount secured to said I-beam at a point directly opposite each said base support member.

2. A shock resistant sub-base for the mounting of heavy equipment on a ship's hull having transverse frame members comprising two channel members arranged in parallel relationship to the longitudinal axis of the ship and in spaced relationship to each other, means for securing said channel members to each of said transverse frame members, an I-beam positioned between said channel members and in frictional contact therewith, a fixed first bolt passing through said channels and I-beam only at points substantially midway between each two of said transverse frame members, said I-beam having an elongated slot substantially in the center thereof at points directly opposite each of said frame members, a second bolt passing through said channels and the elongated slot in said I-beam and in sliding relationship with said I-beam, and means for securing said heavy equipment to said I-beam at points directly opposite each of said frame members, whereby shock applied to said hull must be transmitted through said transverse frame member, channels, first bolt, and I-beam before reaching said equipment.

3. A vibration absorbing mount for heavy equipment comprising a first supporting means consisting of an I-beam, a second supporting means consisting of a pair of channels located on opposite sides of the web of said I-beam, said second supporting means having at least a portion thereof in parallel frictional engagement with said first supporting means; both said supporting means having a predetermined elastic limit, means for rigidly connecting said first and second supporting means together at one portion thereof, said rigid connection means having a predetermined shearing strength, means at another portion thereof for connecting said first supporting means to said equipment, means for connecting another portion of said second supporting means to a base, the means for connecting said first supporting means to said equipment and the means for connecting said second supporting means to a base being on opposite sides of said supporting means and equally spaced from said rigid connection means, and said I-beam being notched at the portion thereof where said channels are connected to said base.

4. A vibration absorbing mount for heavy equipment as claimed in claim 3 wherein said I-beam has a web depth which is greater than the depth of said channels.

5. A vibration absorbing mount for heavy equipment as claimed in claim 4 wherein said channels are mounted symmetrically with respect to said I-beam thereby allowing movement of said channels with respect to said I-beam in both directions perpendicular to the normal longitudinal axis of said beams.

6. A vibration absorbing mount for heavy equipment as claimed in claim 3 wherein the shearing strength of the rigid connection means is less than the elastic limit of the remaining elements of the mount.

7. A shock absorbing mount for heavy equipment comprising a first supporting means consisting of a beam member, a second supporting means consisting of a pair of elongated elements located on opposite sides of said beam member, said second supporting means having at least a portion thereof in parallel frictional engagement with said first supporting means; both said supporting means having a predetermined elastic limit, means for rigidly connecting said first and second supporting means together at one portion thereof, said rigid connection means having a predetermined shearing strength, means at another portion thereof for connecting said first supporting means to said equipment, means for connecting another portion of said second supporting means to a base, the means for connecting said first supporting means to said equipment and means for connecting said second supporting means to a base being on opposite sides of said supporting means and equally spaced from said rigid connection means, and said beam member being notched at the portion thereof where said elongated members are connected to said base.

References Cited in the file of this patent

UNITED STATES PATENTS 2,911,169     Contreras _____ Nov. 3, 1959